(12) United States Patent
Shimura et al.

(10) Patent No.: US 12,434,202 B2
(45) Date of Patent: Oct. 7, 2025

(54) COMPOSITE SEMIPERMEABLE MEMBRANE

(71) Applicant: TORAY INDUSTRIES, INC., Tokyo (JP)

(72) Inventors: Harutoki Shimura, Shiga (JP); Takaaki Yasuda, Shiga (JP); Shinya Mitsui, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 351 days.

(21) Appl. No.: 18/269,385

(22) PCT Filed: Dec. 24, 2021

(86) PCT No.: PCT/JP2021/048432
§ 371 (c)(1),
(2) Date: Jun. 23, 2023

(87) PCT Pub. No.: WO2022/138975
PCT Pub. Date: Jun. 30, 2022

(65) Prior Publication Data
US 2024/0100487 A1    Mar. 28, 2024

(30) Foreign Application Priority Data
Dec. 25, 2020 (JP) ................. 2020-216354

(51) Int. Cl.
| | | |
|---|---|---|
| B01D 53/22 | (2006.01) | |
| B01D 69/02 | (2006.01) | |
| B01D 69/10 | (2006.01) | |
| B01D 69/12 | (2006.01) | |
| B01D 71/56 | (2006.01) | |

(52) U.S. Cl.
CPC ............ *B01D 69/10* (2013.01); *B01D 69/02* (2013.01); *B01D 69/1214* (2022.08); *B01D 71/56* (2013.01); *B01D 2325/43* (2022.08)

(58) Field of Classification Search
CPC .... B01D 69/10; B01D 69/1214; B01D 69/02; B01D 71/56; B01D 2325/43
See application file for complete search history.

(56) References Cited

U.S. PATENT DOCUMENTS

| | | | | |
|---|---|---|---|---|
| 4,473,474 A | * | 9/1984 | Ostreicher | B01D 67/00111 210/636 |
| 6,406,626 B1 | * | 6/2002 | Murakami | B01D 71/56 427/244 |
| 9,457,318 B2 | * | 10/2016 | Linder | B01D 69/1214 |
| 9,610,546 B2 | * | 4/2017 | Sinton | B01D 53/228 |
| 2006/0201884 A1 | * | 9/2006 | Kulprathipanja | C10G 31/11 210/651 |
| 2012/0039920 A1 | * | 2/2012 | Rasmussen | B01J 20/286 536/25.4 |
| 2015/0129485 A1 | | 5/2015 | Roy et al. | |
| 2016/0008773 A1 | | 1/2016 | Yoneda et al. | |
| 2016/0303517 A1 | * | 10/2016 | Diallo | B01D 69/12 |
| 2017/0120201 A1 | | 5/2017 | Shimura et al. | |
| 2018/0161735 A1 | * | 6/2018 | Huizing | B01D 71/5211 |
| 2019/0247800 A1 | | 8/2019 | Ogawa et al. | |
| 2021/0001281 A1 | | 1/2021 | Shimura et al. | |
| 2021/0001282 A1 | | 1/2021 | Shimura et al. | |
| 2022/0305437 A1 | * | 9/2022 | Ho | B01D 69/02 |
| 2023/0064768 A1 | * | 3/2023 | Azman | B01D 69/144 |
| 2023/0330604 A1 | * | 10/2023 | Pereira Nunes | B01D 71/56 |
| 2024/0198293 A1 | * | 6/2024 | Amano | B01D 71/56 |
| 2024/0382907 A1 | * | 11/2024 | Ogawa | B01D 69/02 |

FOREIGN PATENT DOCUMENTS

| | | |
|---|---|---|
| JP | 2020-121264 A | 8/2020 |
| WO | WO 2014/133130 A1 | 9/2014 |
| WO | WO 2016/002819 A1 | 1/2016 |
| WO | WO 2017/111140 A1 | 6/2017 |
| WO | WO 2019/168137 A1 | 9/2019 |
| WO | WO 2019/188138 A1 | 9/2019 |

OTHER PUBLICATIONS

Saudi Arabian Examination Report for Saudi Arabian Application No. 523441341, dated Jun. 6, 2024, with English translation.
International Search Report (PCT/ISA/210), issued in PCT/JP2021/048432, dated Mar. 8, 2022.
Written Opinion of the International Searching Authority (PCT/ISA/237), issued in PCT/JP2021/048432, dated Mar. 8, 2022.

\* cited by examiner

*Primary Examiner* — Anthony R Shumate
(74) *Attorney, Agent, or Firm* — Birch, Stewart, Kolasch & Birch, LLP

(57) ABSTRACT

A composite semipermeable membrane, including: a microporous support layer; and a separation functional layer provided on the microporous support layer, in which the separation functional layer includes a crosslinked wholly aromatic polyamide which is a polycondensation product of a polyfunctional aromatic amine and a polyfunctional aromatic acid chloride and contains amino groups and carboxyl groups, and in positive secondary ions measured on a surface of the separation functional layer by time-of-flight secondary ion mass spectrometry, when (count number of m/z=104.03)/(count number of m/z=108.06) is denoted by a, and a molar ratio (carboxyl group/amino group) of the carboxyl group to the amino group, which is obtained by analyzing the entire separation functional layer by $^{13}$C solid state NMR, is denoted by b, the following formulae (1) and (2) are satisfied: a≥5.0 (1); and a/b≥4.3 (2).

7 Claims, No Drawings

COMPOSITE SEMIPERMEABLE MEMBRANE

TECHNICAL FIELD

The present invention relates to a composite semipermeable membrane useful for selective separation of a liquid mixture. The composite semipermeable membrane obtained according to the present invention can be suitably used for desalination of brackish water or seawater.

BACKGROUND ART

A membrane separation method has attracted attention as an energy saving and resource saving method of removing a substance (for example, a salt) dissolved in a solvent (for example, water) from the solvent.

Examples of a membrane used in the membrane separation method include a microfiltration membrane, an ultrafiltration membrane, a nanofiltration membrane, and a reverse osmosis membrane. Such a membrane is used, for example, for production of drinking water from seawater, brackish water, water containing harmful substances, and the like, production of industrial ultrapure water, wastewater treatment, recovery of valuable materials, and the like.

Most of currently commercially available reverse osmosis membranes and nanofiltration membranes are composite semipermeable membranes. As a composite semipermeable membrane, a composite semipermeable membrane including a porous support layer and a separation functional layer provided on the porous support layer and containing a crosslinked polyamide obtained by a polycondensation reaction of a polyfunctional amine and a polyfunctional acid halide is widely used as a separation membrane having high selective permeability (for example, Patent Literature 1).

CITATION LIST

Patent Literature

Patent Literature 1: US Patent Application Publication No. 2015/0129485

SUMMARY OF INVENTION

Technical Problem

In the composite semipermeable membrane in the related art, the salt removal performance may decrease in a case of being in contact with feed water having a significantly high oxidizing property. An object of the present invention is to provide a composite semipermeable membrane capable of preventing a decrease in salt removal performance even being in contact with feed water having high oxidizing properties.

Solution to Problem

In order to implement the above object, the present invention includes the following 1 to 7.
1. A composite semipermeable membrane, including:
   a microporous support layer; and
   a separation functional layer provided on the microporous support layer,
   in which
   the separation functional layer includes a crosslinked wholly aromatic polyamide which is a polycondensation product of a polyfunctional aromatic amine and a polyfunctional aromatic acid chloride and contains amino groups and carboxyl groups, and
   in positive secondary ions measured on a surface of the separation functional layer by time-of-flight secondary ion mass spectrometry, when (count number of m/z=104.03)/(count number of m/z=108.06) is denoted by a, and a molar ratio (carboxyl group/amino group) of the carboxyl group to the amino group, which is obtained by analyzing the entire separation functional layer by $^{13}$C solid state NMR, is denoted by b, the following formulae (1) and (2) are satisfied:

$$a \geq 5.0 \quad (1); \text{ and}$$

$$a/b \geq 4.3 \quad (2).$$

2. The composite semipermeable membrane according to 1, in which the a and the b satisfy the following formula (3):

$$a/b \geq 5.5 \quad (3).$$

3. The composite semipermeable membrane according to 2, in which the a satisfies the following formula (4):

$$a \geq 7.0 \quad (4).$$

4. The composite semipermeable membrane according to any one of 1 to 3, in which the separation functional layer has a difference in yellow index ($\Delta$YI) before and after vanillin yellowing test of 2 or more and 20 or less.
5. The composite semipermeable membrane according to any one of 1 to 4, in which constituent elements of the separation functional layer detected by a combustion method are substantially only hydrogen, carbon, nitrogen, and oxygen.
6. The composite semipermeable membrane according to any one of 1 to 5, in which the separation functional layer is decomposed into one or more types of aromatic amines and two or more types of aromatic carboxylic acids or aromatic carboxylates by alkaline hydrolysis.
7. The composite semipermeable membrane according to 6, in which among the aromatic carboxylic acids and the aromatic carboxylates, trimesic acid and a trimesic acid salt occupy a fraction of 90 mass % or more.

Advantageous Effects of Invention

According to the composite semipermeable membrane of the present invention, a decrease in salt removal rate can be prevented even in a case of being into contact with feed water having significantly high oxidizing properties.

DESCRIPTION OF EMBODIMENTS

A composite semipermeable membrane according to an embodiment of the present invention includes a microporous support layer and a separation functional layer provided on the microporous support layer, in which the separation functional layer contains a crosslinked wholly aromatic polyamide which is a polycondensation product of a polyfunctional aromatic amine and a polyfunctional aromatic acid chloride and which contains amino groups and carboxyl groups. The composite semipermeable membrane according to the embodiment of the present invention satisfies the following formulae (1) and (2) for positive secondary ions measured on a surface of the separation functional layer by time-of-flight secondary ion mass spectrometry when (count number of m/z=104.03)/(count number of m/z=108.06) is denoted by a, and a molar ratio (carboxyl group/amino group) of carboxyl groups to amino groups obtained by analyzing the entire separation functional layer by $^{13}C$ solid state NMR is denoted by b.

$$a \geq 5.0 \quad (1)$$

$$a/b \geq 4.3 \quad (2)$$

A composite semipermeable membrane according to an embodiment of the present invention includes, for example, a support membrane including a substrate and a microporous support layer formed on the substrate, and a separation functional layer formed on the microporous support layer. The separation functional layer has substantial separation performance. The support membrane has substantially no separation performance for ions or the like, and can impart strength to the separation functional layer.

(1-1) Substrate

Examples of the substrate include polyester-based polymers, polyamide-based polymers, polyolefin-based polymers, and mixtures and copolymers thereof. Among them, a fabric of a polyester-based polymer having high mechanical and thermal stability is particularly preferable.

A thickness of the substrate is preferably within a range of 10 μm to 200 μm, and more preferably within a range of 30 μm to 120 μm. In this description, the thickness is an arithmetic mean unless otherwise specified. That is, the thickness of the substrate and the microporous support layer is obtained by calculating an average value of thicknesses at 20 points measured at an interval of 20 μm in a direction (plane direction of the membrane) orthogonal to a thickness direction in cross-sectional observation.

(1-2) Microporous Support Layer

In the present invention, the microporous support layer has substantially no separation performance for ions and the like and is intended to impart strength to a separation functional layer that has substantial separation performance. A size and distribution of pores of the microporous support layer are not particularly limited, and for example, a microporous support layer having uniform and fine pores, or fine pores gradually increasing in size from a surface on which the separation functional layer is formed to the other surface, and having a size (average pore diameter) of the fine pores of 0.1 nm or more and 100 nm or less on the surface on which the separation functional layer is formed is preferable.

As the material constituting the microporous support layer, for example, homopolymers or copolymers such as polysulfones, polyethersulfones, polyamides, polyesters, cellulose-based polymers, vinyl polymers, polyphenylene sulfides, polyphenylene sulfide sulfones, polyphenylene sulfones, and polyphenylene oxides, can be used alone or in combination of two or more thereof. Examples of the cellulose-based polymer include cellulose acetate and cellulose nitrate, and examples of the vinyl polymer include polyethylene, polypropylene, polyvinyl chloride, and polyacrylonitrile. Among them, homopolymers or copolymers such as polysulfones, polyamides, polyesters, cellulose acetates, cellulose nitrates, polyvinyl chlorides, polyacrylonitriles, polyphenylene sulfides, and polyphenylene sulfide sulfones are preferable. More preferable examples thereof include cellulose acetate, polysulfone, polyphenylene sulfide sulfone, and polyphenylene sulfone. Furthermore, among these materials, polysulfones can be generally used because they have high chemical, mechanical, and thermal stability and are easily molded.

Specifically, polysulfones including a repeating unit represented by the following chemical formula are preferably used because the pore diameter of the microporous support layer is easily controlled and the dimensional stability is high.

[CHEM. 1]

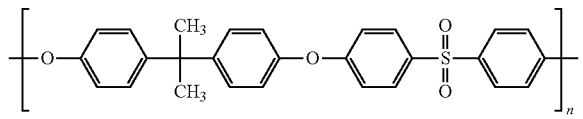

The thickness of the substrate and the microporous support layer affect the strength of the composite semipermeable membrane and the packing density when the composite semipermeable membrane is used as an element. In order to obtain sufficient mechanical strength and packing density, the total thickness of the substrate and the microporous support layer is preferably 30 μm or more and 300 μm or less, and more preferably 100 μm or more and 220 μm or less. The thickness of the microporous support layer is preferably 20 μm or more and 100 μm or less. The thickness of the substrate and the microporous support layer can be obtained by calculating an average value of thicknesses at 20 points measured at an interval of 20 μm in a direction (surface direction of the membrane) orthogonal to the thickness direction in cross-sectional observation.

(1-3) Separation Functional Layer

In the present invention, the separation functional layer contains a crosslinked wholly aromatic polyamide. In particular, the separation functional layer preferably contains a crosslinked wholly aromatic polyamide as a main component. The main component refers to a component occupying 50 wt % or more of the components of the separation functional layer. When the separation functional layer contains 50 wt % or more of the crosslinked wholly aromatic polyamide, higher removal performance can be exhibited. The separation functional layer is preferably substantially formed of only the crosslinked wholly aromatic polyamide. The expression "the separation functional layer is substantially formed of only the crosslinked wholly aromatic polyamide" means that 90 wt % or more of the separation functional layer is occupied by the crosslinked wholly aromatic polyamide.

The crosslinked wholly aromatic polyamide can be formed by interfacial polycondensation between a polyfunctional aromatic amine and a polyfunctional aromatic acid halide. Here, at least one of the polyfunctional aromatic amine and the polyfunctional aromatic acid halide preferably contains a trifunctional or higher functional compound.

Hereinafter, the separation functional layer in the present invention may be referred to as a polyamide separation functional layer.

The polyfunctional aromatic amine means an aromatic amine having two or more amino groups of at least one of a primary amino group and a secondary amino group in one molecule, and at least one of the amino groups is a primary amino group. Examples of the polyfunctional aromatic amine include polyfunctional aromatic amines in which two amino groups are bonded to an aromatic ring in any positional relationship of an ortho position, a meta position, and a para position, such as o-phenylenediamine, m-phenylenediamine, p-phenylenediamine, o-xylylenediamine, m-xylylenediamine, p-xylylenediamine, o-diaminopyridine, m-diaminopyridine, and p-diaminopyridine; and polyfunctional aromatic amines such as 1,3,5-triaminobenzene, 1,2, 4-triaminobenzene, 3,5-diaminobenzoic acid, 3-aminobenzylamine, and 4-aminobenzylamine. In particular, in consideration of selective permeability and heat resistance of the membrane, m-phenylenediamine, p-phenylenediamine, and 1,3,5-triaminobenzene are preferably used. Among them, m-phenylenediamine (hereinafter also referred to as m-PDA) is more preferably used in view of availability and ease of handling. These polyfunctional aromatic amines may be used alone or in combination of two or more thereof.

The polyfunctional aromatic acid halide refers to an aromatic acid halide having at least two halogenated carbonyl groups in one molecule. Examples of a trifunctional acid halide include a trimesic acid chloride, and examples of a bifunctional acid halide include biphenyl dicarboxylic acid dichloride, azo benzene dicarboxylic acid dichloride, terephthalic acid chloride, isophthalic acid chloride, and naphthalene dicarboxylic acid chloride.

The polyfunctional aromatic acid chloride is excellent in reactivity with the polyfunctional aromatic amine, and therefore is preferable as a polyfunctional aromatic acid halide. When the polyfunctional aromatic acid halide is a polyfunctional aromatic acid chloride having 2 to 4 chlorocarbonyl groups in one molecule, a membrane having more excellent selectivity and heat resistance can be obtained. As the polyfunctional aromatic acid halide, two or more types of compounds are preferably used in order to control an amount of the functional groups by a sequential reaction to be described later, and a mixture of a compound having a high reaction rate with a polyfunctional aromatic amine and a compound having a low reaction rate with a polyfunctional aromatic amine is preferably used. In a case where polyfunctional aromatic acid halides are mixed to be used, a trifunctional aromatic acid halide is preferably used as the main component. The trifunctional aromatic acid halide can crosslink the polyamide. From the viewpoint of membrane performance, the trifunctional aromatic acid halide is preferably a trimesic acid chloride, and a ratio of the trimesic acid chloride to the total amount of the polyfunctional aromatic acid halide to be used is more preferably 90 mass % or more.

The polyamide separation functional layer contains an amide group derived from polymerization of a polyfunctional aromatic amine and a polyfunctional aromatic acid halide, and amino groups and carboxyl groups derived from unreacted functional groups. As a result of intensive studies on the mass ratio between the amino groups and the carboxyl groups, the present inventors obtained the following findings. Since the amino groups on the surface of the membrane serves as a starting point of oxidative degradation of the membrane, it is preferable to reduce the amount thereof in order to improve durability. Since the carboxyl groups on the surface of the membrane have high hydrophilicity and chargeability, it is preferable to increase the amount thereof from the viewpoint of improving the salt removal rate and the desalination amount. Specifically, when a ratio of (count number of m/z=104.03)/(count number of m/z=108.06) for positive secondary ions measured on the surface of the separation functional layer by time-of-flight secondary ion mass spectrometry is denoted by a, a is 5.0 or more, and preferably 7.0 or more. That is, a≥5.0 and preferably, a≥7.0.

Here, m/z=104.03 is assigned to an ion ($C_7H_4O^+$) derived from a partial structure of the aromatic polyamide. m/z=108.06 is assigned to an ion ($C_6H_8N_2^+$) derived from a partial structure of the aromatic polyamide.

On the other hand, by presence of amino groups in a certain amount in the entire separation functional layer, a crosslinked structure can be appropriately formed, and the basic performance can be relatively increased. When the molar ratio of the carboxyl group to the amino group (carboxyl group/amino group) obtained by analyzing the entire separation functional layer by $^{13}C$ solid state NMR is denoted by b, the ratio of the value a to b is a/b≥4.3 and preferably a/b≥5.5.

The amount of surface amino groups is represented by difference in yellow index (ΔYI) before and after vanillin yellowing test obtained by the following method. Difference in yellow index preferably satisfies the range of 2 or more and 20 or less from the viewpoint of improving oxidation resistance.

(Method for Measuring Difference in Yellow Index ΔYI)

The composite semipermeable membrane is washed with hot water at 90° C. for 5 minutes, then the hot water is replaced, and the composite semipermeable membrane is washed again with hot water at 90° C. for 5 minutes. Next, the composite semipermeable membrane is vacuum dried for 2 hours. The dried composite semipermeable membrane is measured by a color computer (SM-6, manufactured by Suga Test Instruments Co., Ltd.) using the separation functional layer as a measurement surface to obtain the yellow index ($YI_0$) of the initial separation functional layer. Subsequently, the composite semipermeable membrane is immersed in a vanillin/ethanol (mass ratio: 2/98) solution for 15 seconds. The immersed composite semipermeable membrane is air-dried for 1 hour to remove ethanol, and then subjected to a drying heat treatment at 150° C. for 15 minutes. The composite semipermeable membrane after the drying heat treatment is measured by a color computer using the separation functional layer as a measurement surface to obtain the yellow index (YI) of the separation functional layer after the vanillin yellowing test. From the obtained $YI_0$ and YI, difference in yellow index (ΔYI) of the separation functional layer before and after the vanillin yellowing test is calculated based on the following equation. Five points were selected at random as measurement points, and the average thereof was defined as difference in yellow index (ΔYI).

$$\Delta YI = YI - YI_0$$

In the composite semipermeable membrane according to the embodiment of the present invention, the constituent elements of the separation functional layer detected by the combustion method are preferably substantially only hydrogen, carbon, nitrogen, and oxygen. The fact that the constituent elements of the separation functional layer detected by the combustion method are substantially only hydrogen, carbon, nitrogen, and oxygen means that elements other than those described above detected as the constituent elements of the separation functional layer are 1% or less. The fact that the constituent elements of the separation functional layer are substantially only hydrogen, carbon, nitrogen, and oxygen is a sufficient condition of that the separation functional layer is not significantly halogenated or contaminated, and thus is preferable. Specific examples of a method for detecting the constituent elements of the separation functional layer by the combustion method include a method of dissolving the microporous support layer of the composite semipermeable membrane using an organic solvent such as methylene chloride, sufficiently washing the microporous support layer, and analyzing the isolated separation functional layer with an element analyzer by the combustion method.

The separation functional layer is preferably decomposed into one or more types of aromatic amines and two or more types of aromatic carboxylic acids or aromatic carboxylates by alkaline hydrolysis. The alkaline hydrolysis means that the amide group of the separation functional layer is cleaved to be decomposed into a monomer-derived amine and carboxylic acid. For example, the separation functional layer can be subjected to an alkaline hydrolysis by dissolving the microporous support layer of the composite semipermeable membrane using an organic solvent such as methylene chloride, sufficiently washing the microporous support layer, and holding the isolated separation functional layer in a high-concentration and high-temperature aqueous solution of sodium hydroxide until the solid content is dissolved. Among the aromatic carboxylic acids and the aromatic carboxylates obtained by the alkaline hydrolysis, the trimesic acid and the trimesic acid salt preferably occupy a fraction of 90 mass % or more.

2. Method for Producing Composite Semipermeable Membrane

Next, a method for producing the composite semipermeable membrane will be described. The method for producing a composite semipermeable membrane includes a step of forming a microporous support layer on a substrate and a step of forming a separation functional layer on the microporous support layer.

(2-1) Formation of Microporous Support Layer

The microporous support layer can be formed by dissolving a resin in a good solvent to obtain a solution of the resin, applying the solution onto a substrate, and immersing the substrate in a coagulation bath. For example, a N,N-dimethylformamide (hereinafter referred to as DMF) solution of polysulfone is poured on a nonwoven fabric at a certain thickness and solidified in water, thereby obtaining a microporous support layer having fine pores with a diameter of several tens of nm or less in most of the surface.

(2-2) Method for Forming Separation Functional Layer

Next, the step of forming a separation functional layer constituting the composite semipermeable membrane will be described. The step of forming a separation functional layer is a step of forming a polyamide layer by interfacial polycondensation of a polyfunctional aromatic amine and a polyfunctional aromatic acid halide, and includes the following steps (A) to (C):

(A) impregnating the microporous support layer with an aqueous solution containing a polyfunctional aromatic amine, (B) after the step (A), applying an organic solvent solution containing a polyfunctional aromatic acid halide to the microporous support layer, and (C) reacting the polyfunctional aromatic amine with the polyfunctional aromatic acid halide.

The step (C) proceeds after step (B) until washing. The time and temperature in the step (C) can be changed according to the type of monomer used, the characteristics required for the membrane, and the like. For example, the temperature may be room temperature, and may be 30° C. or higher by heating. The temperature may be changed in the step (C).

The steps (B) and (C) may have the following variations.

(1) In the step (B), an organic solvent solution containing two or more types of polyfunctional aromatic acid halides having different reaction rates with the amino group contained in the polyfunctional aromatic amine may be applied. In this case, the polyfunctional aromatic acid halide having a higher reaction rate first reacts to form a polyamide layer. After the polyfunctional aromatic acid halide having a higher reaction rate is consumed and the concentration thereof is reduced, the polyfunctional aromatic acid halide having a lower reaction rate reacts with the amino group present on the surface of the polyamide layer, thereby reducing the amount of the amino group on the surface. Heating may be performed in the middle of the step (C), that is, the step (C) may include the first step in which the temperature is low and the second step in which the temperature is high, thereby promoting the reaction of the polyfunctional aromatic acid halide having a lower reaction rate in the second step.

(2) The steps (B) and (C) may be repeated twice or more after the step (A), and in each step (B) at this time, a solution containing a polyfunctional aromatic acid halide of the same type may be used, or a solution containing a polyfunctional aromatic acid halide having a reaction rate lower than that in the first step may be used in the second and subsequent steps. When the same type of polyfunctional aromatic acid halide is used, the concentration of the polyfunctional aromatic acid halide is higher in the second and subsequent steps than in the first step. For example, in the second and subsequent steps, the concentration of the polyfunctional aromatic acid halide is 1.5 times or more that in the first step. In the step (C) carried out after the application of the solution containing the polyfunctional aromatic acid halide having a lower reaction rate, the temperature may be increased over the whole thereof or in the middle thereof. Accordingly, it is possible to form a polyamide layer first and then react the polyfunctional aromatic acid halide with the amino group on the surface thereof.

(3) In the step (C), the temperature of the surface (surface on the microporous support layer side) of the support membrane may be higher than the temperature of a rear surface (surface on the substrate side) of the support membrane. According to this method, the reaction of the polyfunctional aromatic acid halide with the amino group on the surface of the polyamide layer can be promoted. Examples of a specific method for forming such a temperature gradient include heating the surface of the support membrane. The temperature rise of the rear surface may be reduced by blowing air to the rear surface simultaneously with the heating of the front surface of the support membrane. The formation of such a temperature gradient may be applied to either (1) or (2). For example, a mixture of two or more types of polyfunctional aromatic acid halide having different reaction rates may be applied in the step (B), and a temperature gradient may be formed from the start of the step (C) or from the middle of the step (C). In addition, a temperature gradient may be formed over the entire reaction time or a part thereof after the polyfunctional aromatic acid halides having different reaction rates are applied stepwise and the polyfunctional acid halide having a low reaction rate is applied.

According to any one of the methods (1) to (3), the amount of amino groups on the layer surface is reduced, and as a result, the above functional group ratio between the surface and the inside is implemented.

In the step (A), the concentration of the polyfunctional aromatic amine in the aqueous solution of polyfunctional aromatic amine is preferably in the range of 0.1 mass % or more and 20 mass % or less, and more preferably in the range of 0.5 mass % or more and 15 mass % or less. In a case where the concentration of the polyfunctional aromatic amine is within this range, sufficient solute removal performance and water permeability can be obtained. The aqueous solution of polyfunctional aromatic amine may contain a surfactant, an organic solvent, an alkaline compound, an antioxidant, or the like, as long as it does not interfere with the reaction between the polyfunctional aromatic amine and the polyfunctional aromatic acid halide. The surfactant has an effect of improving wettability of the support membrane surface and reducing an interfacial tension between the aqueous solution of polyfunctional aromatic amine and a nonpolar solvent.

In the impregnation with the aqueous solution of polyfunctional aromatic amine, the aqueous solution of polyfunctional aromatic amine is preferably brought into contact with the microporous support layer uniformly and continuously on the microporous support layer. Specifically, the aqueous solution of polyfunctional aromatic amine may be applied to the microporous support layer, or the support membrane may be immersed in the aqueous solution of polyfunctional aromatic amine. The contact time between the microporous support layer and the aqueous solution of polyfunctional aromatic amine is preferably 1 second or longer and 10 minutes or shorter, and more preferably 10 seconds or longer and 3 minutes or shorter.

After impregnating the microporous support layer with the aqueous solution of polyfunctional aromatic amine, liquid is sufficiently removed so that no liquid droplet remains on the membrane. By sufficiently removing the liquid, it is possible to prevent a liquid droplet remaining portion from becoming a membrane defect after the formation of the microporous support layer, thereby preventing the removal performance from deteriorating. As the liquid removal method, for example, as described in JP H02-78428A, a method of holding the support membrane after being in contact with the aqueous solution of polyfunctional aromatic amine in a vertical direction and allowing the excess aqueous solution to naturally flow down, a method of forcibly removing the liquid by blowing an air flow such as nitrogen from an air nozzle, or the like can be used. After the liquid removal, the membrane surface can be dried to partially remove the water in the aqueous solution.

In the step (B), the concentration of the polyfunctional aromatic acid halide in the organic solvent solution is preferably in the range of 0.01 mass % or more and 10 mass % or less, and more preferably in the range of 0.02 mass % or more and 2.0 mass % or less. The reason is that a sufficient reaction rate can be obtained by setting the concentration to 0.01 mass % or more, and occurrence of a side reaction can be prevented by setting the concentration to 10 mass % or less. This concentration range is applied to all steps when the step (B) includes a plurality of steps. In a case where the organic solvent solution contains a plurality of types of polyfunctional aromatic acid halides, the total concentration thereof is preferably in this range. Examples of the polyfunctional aromatic acid halide having a relatively high reaction rate include trimesic acid chloride (TMC), and examples of the acid halide having a relatively low reaction rate include isophthalic acid chloride, terephthalic acid chloride, 1,3-benzenedisulfonyl chloride, 2,4-mesitylenedisulfonyl dichloride, and 2,4,5,6-tetramethylbenzenedisulfonyl dichloride.

The organic solvent is desirably immiscible with water, dissolves the polyfunctional aromatic acid halide, and does not break the support membrane, and may be any solvent that is inactive to the polyfunctional amine compound and the polyfunctional aromatic acid halide. Preferable examples thereof include hydrocarbon compounds such as n-hexane, n-octane, n-decane, and isooctane.

In a case where heating is performed in the step (C), irradiation with infrared ray, hot air, hot water vapor, or a combination of these means may be used. The temperature and the reaction time during heating may be changed according to the compound to be used. The maximum temperature for the heat treatment is preferably 50° C. or higher and 180° C. or lower, and more preferably 60° C. or higher and 160° C. or lower. The optimum heating time varies depending on the temperature of the membrane surface as a reaction field, and is preferably 10 seconds or longer, more preferably 20 seconds or longer.

3. Use of Composite Semipermeable Membrane

The composite semipermeable membrane according to the embodiment of the present invention is wound around a tubular water collection tube in which a large number of holes are bored together with, for example, a feed water channel material such as a plastic net, a permeate water channel material such as a tricot, and a film for increasing pressure resistance as necessary, to be suitably used as a spiral type composite semipermeable membrane element. Furthermore, a composite semipermeable membrane module in which these elements are connected in series or in parallel and accommodated in a pressure vessel can also be provided.

The composite semipermeable membrane, the element thereof, and the module can constitute a fluid separation device in combination with a pump that supplies feed water thereto, a device that subjects the feed water to pretreatment, and the like. By using such a separation device, the feed water can be separated into permeate water such as drinking water and concentrated water that does not permeate through the membrane to obtain water which suits for a purpose.

Examples of the feed water to be treated by the composite semipermeable membrane according to the embodiment of the present invention include a liquid mixture containing 500 mg/L or more and 100 g/L or less of total dissolved solid (TDS) such as seawater, brackish water, and wastewater. In general, TDS indicates the total dissolved solid content, and is represented by "mass/volume" or "weight ratio (mass ratio)". According to the definition, the TDS can be calculated from the weight of the residue obtained by evaporating the solution filtered through a 0.45 μm filter at the temperature of 39.5° C. or higher and 40.5° C. or lower. More conveniently, it is converted from the practical salinity (S).

As the operation pressure of the fluid separation device is higher, the solute removal rate is improved, and the energy required for the operation is also increased. In view of this and the durability of the composite semipermeable membrane, the operation pressure when the feed water is permeated through the composite semipermeable membrane is preferably 0.5 MPa or more and 10 MPa or less. The temperature of the feed water is preferably 5° C. or higher because as the temperature decreases, the membrane permeation flux decreases. Since as the temperature increases, the solute removal rate decreases, the temperature of the feed water is preferably 55° C. or lower. In a case of the feed water having a high solute concentration such as seawater, when the pH of the feed water is increased, there is a concern that scale of magnesium or the like is generated, and there is a concern that the membrane is deteriorated by high pH operation, and thus the operation in a neutral region is preferable.

EXAMPLES

Hereinafter, the present invention will be described in more detail with reference to Examples, but the present invention is not limited to these Examples.

The analysis on functional groups and compositions in Examples and Comparative Examples was performed as follows. Hereinafter, the operation was performed at 25° C. unless otherwise specified.

(Quantification of Surface Functional Group)

A composite semipermeable membrane was dried at room temperature under vacuum, and was subjected to time-of-flight secondary ion mass spectrometry using a TOF SIMS 5 device (manufactured by ION TOF) (secondary ion polarity: positive, mass range (m/z)=0 to 200, raster size: 300 µm, number of scans: 16, number of pixels (one side)=256, degree of vacuum to be measured=$4\times10^{-7}$ Pa or less, primary ion species: $Bi_3^{++}$, primary ion acceleration voltage=25 kv, pulse width=12.5, 13.3 ns, bunching: present, charge neutralization: present, subsequent acceleration: 10 kv). From the measurement results, the count numbers at the positive secondary ions m/z=104.03 and m/z=108.06 were obtained. From the results, (the count number of m/z=104.03)/(the count number of m/z=108.06), that is, the value a was obtained.

(Quantification of Functional Group of Entire Separation Functional Layer)

The substrate was physically peeled off from the composite semipermeable membrane of 5 $m^2$, and the microporous support layer and the separation functional layer were recovered. The microporous support layer and the separation functional layer were allowed to stand for 24 hours for drying, and then added little by little into a beaker containing dichloromethane and stirred to dissolve the polymer constituting the microporous support layer. An insoluble matter in the beaker was collected with filter paper. The insoluble matter was put into a beaker containing dichloromethane and stirred to collect the insoluble matter in the beaker. This operation was repeated until elution of the polymer forming the microporous support layer in the dichloromethane solution could not be detected. The recovered separation functional layer was dried in a vacuum dryer to remove the remaining dichloromethane. The obtained separation functional layer was freeze-ground into a powder sample and was sealed in a sample tube used for solid state NMR measurement, and $^{13}C$ solid state NMR measurement was performed by a CP/MAS method and a DD/MAS method. For $^{13}C$ solid state NMR measurement, for example, CMX-300 manufactured by Chemagnetics can be used. Measurement conditions were shown below.

Reference material: polydimethylsiloxane (internal reference: 1.56 ppm)
Sample rotation speed: 10.5 kHz
Pulse repetition time: 100 s From the obtained spectrum, peak division was performed for each peak derived from a carbon atom to which each functional group was bonded, and a functional group content ratio was determined from an area of the divided peak. From the results, the molar ratio of the carboxyl group to the amino group (carboxyl group/amino ratio), that is, the value b was obtained.

(Membrane Characteristics)

Various characteristics of the composite semipermeable membrane were obtained by supplying seawater adjusted to pH of 6.5 (TDS concentration of 3.5 mass %, boron concentration of about 5 mass ppm) to the composite semipermeable membrane at an operation pressure of 5.5 MPa to perform a membrane filtration treatment for 24 hours, and then measuring the water quality of the permeate water and the feed water.

(Membrane Permeation Flux)

An amount of membrane permeate water of the feed water (seawater) is expressed by a water permeation amount (cubic meter) per square meter of the membrane surface and per day as a membrane permeation flux ($m^3/m^2/day$).

(Durability Acceleration Test)

The composite semipermeable membrane was immersed in a 25 mg/L aqueous solution of sodium hypochlorite adjusted to pH of 7.0 at 25° C. for 24 hours. Thereafter, the composite semipermeable membrane was immersed in a 1,000 mg/L aqueous solution of sodium hydrogen sulfite for 10 minutes, and then sufficiently washed with water. The obtained composite semipermeable membrane was subjected to a liquid flow test in accordance with the method described above to determine the performance after chlorine degradation. (Salt permeability coefficient after durability acceleration test)/(salt permeability coefficient before durability acceleration test) was determined as the SP ratio and used as an index related to the deterioration of the salt removal performance. As the SP ratio is smaller and closer to 1, it can be evaluated that the decrease in the salt removal rate after the durability acceleration test is prevented.

(Production of Support Membrane)

A 16.0 mass % DMF solution of polysulfone (PSf) was cast in a thickness of 200 µm on a polyester nonwoven fabric (air flow rate of 2.0 $cc/cm^2/sec$), immediately immersed in pure water and allowed to stand for 5 minutes to prepare a support membrane.

Example 1

A 2.0 mass % aqueous solution of m-phenylenediamine (mPDA) was prepared. The support membrane obtained by the above operation was immersed in the aqueous solution for 2 minutes, and the support membrane was slowly pulled up in a vertical direction. After nitrogen was blown from an air nozzle to remove an excess aqueous solution from the surface of the support membrane, a decane solution at 45° C. containing 0.10 mass % of trimesic acid chloride (TMC) and 0.010 mass % of isophthalic acid chloride (IPC) was applied so that the surface was completely wet, and the resultant was allowed to stand for 10 seconds. Subsequently, the support membrane was heated in an oven at 120° C. for 20 seconds, and then the membrane was raised to remove the excess solution, and then the coated surface was heated up to 130° C. by an infrared heater and maintained for 3 seconds. Thereafter, the resultant was washed with hot water at 90° C. for 2 minutes to obtain a composite semipermeable membrane. By the above operation, the composite semipermeable membrane according to Example 1 was obtained.

Example 2

A composite semipermeable membrane according to Example 2 was obtained in the same manner as in Example 1 except that the concentration of IPC was 0.015 mass %.

Example 3

A composite semipermeable membrane according to Example 3 was obtained in the same manner as in Example 1 except that the concentration of IPC was 0.030 mass %.

Example 4

A 2.0 mass % aqueous solution of mPDA was prepared. The support membrane obtained by the above operation was immersed in the aqueous solution for 2 minutes, and the support membrane was slowly pulled up in a vertical direction. After nitrogen was blown from an air nozzle to remove an excess aqueous solution from the surface of the support membrane, a decane solution at 45° C. containing 0.10 mass % of TMC and 0.010 mass % of IPC was applied so that the surface was completely wet, and the resultant was allowed to stand for 10 seconds. Next, the coated surface was heated by blowing hot air at 120° C. and the back surface was heated by blowing hot air at 70° C. for 1 minute. Thereafter, the resultant was washed with hot water at 90° C. for 2 minutes to obtain a composite semipermeable membrane. By the above operation, a composite semipermeable membrane according to Example 4 was obtained.

Example 5

A 2.0 mass % aqueous solution of m-phenylenediamine was prepared. The support membrane obtained by the above operation was immersed in the aqueous solution for 2 minutes and was slowly pulled up in a vertical direction, nitrogen was blown from an air nozzle to remove the excess aqueous solution from the surface of the support membrane, and thereafter, a decane solution at 45° C. containing 0.10 mass % of TMC was applied so that the surface was completely wet, the membrane was then left to stand for 3 seconds, raised to remove the excess aqueous solution, and again made horizontal, a decane solution at 45° C. containing 1.0 mass % of IPC was applied, and the membrane was left to stand for 10 seconds and then was heated in an oven at 120° C. for 20 seconds. Further, the resultant was washed with hot water at 90° C. for 2 minutes to obtain a composite semipermeable membrane. By the above operation, a composite semipermeable membrane according to Example 5 was obtained.

Example 6

A composite semipermeable membrane according to Example 6 was obtained in the same manner as in Example 1 except that terephthalic acid chloride (TPC) was used instead of IPC.

Example 7

A composite semipermeable membrane according to Example 7 was obtained in the same manner as in Example 1 except that 1,3-benzenedisulfonyl chloride was used instead of isophthalic acid chloride.

Comparative Example 1

A 2.0 mass % aqueous solution of m-phenylenediamine was prepared. The support membrane obtained by the above operation was immersed in the aqueous solution for 2 minutes and then was slowly pulled up in a vertical direction, nitrogen was blown from an air nozzle to remove the excess aqueous solution from the surface of the support membrane, and thereafter, a decane solution at 45° C. containing 0.10 mass % of TMC was applied so that the surface was completely wet, the membrane was then left to stand for 10 seconds, heated in an oven at 120° C. for 20 seconds, and washed with hot water at 90° C. for 2 minutes to obtain a composite semipermeable membrane according to Comparative Example 1.

Comparative Example 2

A composite semipermeable membrane according to Comparative Example 2 was obtained in the same manner as in Comparative Example 1 except that a decane solution containing 0.10 mass % of TMC and 0.030 mass % of IPC was used.

Comparative Example 3

A 2.0 mass % aqueous solution of m-phenylenediamine was prepared. The support membrane obtained by the above operation was immersed in the aqueous solution for 2 minutes and then was slowly pulled up in the vertical direction, nitrogen was blown from an air nozzle to remove the excess aqueous solution from the surface of the support membrane, and thereafter, a decane solution at 25° C. containing 0.10 mass % of TMC was applied so that the surface was completely wet, the membrane was then left to stand for 10 seconds and washed with hot water at 90° C. for 2 minutes to obtain a composite semipermeable membrane according to Comparative Example 3.

Comparative Example 4

The composite semipermeable membrane according to Comparative Example 1 was immersed in a 30° C. aqueous solution containing 50 mass ppm of sodium hypochlorite adjusted to pH of 7.7 for 30 seconds and then washed with water. Finally, the membrane was immersed in a 1000 mass ppm aqueous solution of sodium hydrogen sulfite for 13 seconds to obtain a composite semipermeable membrane according to Comparative Example 4.

Comparative Example 5

The composite semipermeable membrane according to Comparative Example 1 was immersed, for 37 seconds, in a 35° C. aqueous solution containing 4,000 mass ppm of sodium nitrite adjusted to pH of 3.0 and then washed with water, thereby obtaining a composite semipermeable membrane according to Comparative Example 5.

Structures and performances of the composite semipermeable membranes obtained in the above examples are shown in Table 1. It can be seen that the composite semipermeable membrane according to the present invention has a low SP ratio (ratio of the salt permeability coefficient before and after the durability acceleration test) and has high performance of maintaining a high salt removal rate even in a case of being in contact with feed water having remarkably high oxidizing properties.

TABLE 1

| | Membrane measurement result | | | Initial performance | | Performance after durability acceleration test |
|---|---|---|---|---|---|---|
| | a (—) | b (—) | a/b (—) | Membrane permeation flux (m³/m²/d) | Salt removal rate (%) | SP ratio |
| Example 1 | 5.7 | 1.3 | 4.5 | 1.01 | 99.77 | 1.15 |
| Example 2 | 7.7 | 1.4 | 5.6 | 0.95 | 99.80 | 1.08 |
| Example 3 | 13.0 | 1.0 | 12.6 | 0.70 | 99.81 | 1.10 |

TABLE 1-continued

|  | Membrane measurement result | | | Initial performance | | Performance after durability acceleration test |
|---|---|---|---|---|---|---|
|  | | | | Membrane permeation flux | Salt removal | |
|  | a (—) | b (—) | a/b (—) | (m³/m²/d) | rate (%) | SP ratio |
| Example 4 | 5.1 | 1.1 | 4.5 | 0.98 | 99.74 | 1.18 |
| Example 5 | 8.0 | 1.1 | 7.5 | 0.85 | 99.75 | 1.12 |
| Example 6 | 7.6 | 1.0 | 7.3 | 0.89 | 99.74 | 1.13 |
| Example 7 | 5.1 | 1.2 | 4.3 | 1.05 | 99.74 | 1.20 |
| Comparative example 1 | 3.5 | 1.1 | 3.3 | 1.05 | 99.72 | 1.24 |
| Comparative example 2 | 4.8 | 1.3 | 3.8 | 0.76 | 99.70 | 1.25 |
| Comparative example 3 | 2.8 | 1.2 | 2.3 | 1.13 | 99.67 | 1.30 |
| Comparative example 4 | 1.8 | 1.1 | 1.6 | 0.99 | 99.74 | 1.24 |
| Comparative example 5 | 2.0 | 1.4 | 1.4 | 1.37 | 99.66 | 1.20 |

Although the present invention has been described in detail with reference to specific embodiments, it is apparent to those skilled in the art that various changes and modifications can be made without departing from the spirit and scope of the present invention. The present application is based on Japanese patent application (JP2020-216354A) filed on Dec. 25, 2020, and the contents thereof are incorporated herein by reference.

INDUSTRIAL APPLICABILITY

The composite semipermeable membrane according to the present invention can be suitably used for desalination of brackish water or seawater.

What is claimed is:

1. A composite semipermeable membrane, comprising:
a microporous support layer; and
a separation functional layer provided on the microporous support layer,
wherein
the separation functional layer comprises a crosslinked wholly aromatic polyamide which is a polycondensation product of a polyfunctional aromatic amine and a polyfunctional aromatic acid chloride and contains amino groups and carboxyl groups, and
in positive secondary ions measured on a surface of the separation functional layer by time-of-flight secondary ion mass spectrometry, when (count number of m/z=104.03)/(count number of m/z=108.06) is denoted by a, and a molar ratio (carboxyl group/amino group) of the carboxyl groups to the amino groups, which is obtained by analyzing the entire separation functional layer by $^{13}$C solid state NMR, is denoted by b, the following formulae (1) and (2) are satisfied:

$$a \geq 5.0 \qquad (1); \text{ and}$$

$$a/b \geq 4.3 \qquad (2).$$

2. The composite semipermeable membrane according to claim 1, wherein the a and the b satisfy the following formula (3):

$$a/b \geq 5.5 \qquad (3).$$

3. The composite semipermeable membrane according to claim 2, wherein the a satisfies the following formula (4):

$$a \geq 7.0 \qquad (4).$$

4. The composite semipermeable membrane according to claim 1, wherein the separation functional layer has a difference in yellow index (ΔYI) before and after vanillin yellowing test of 2 or more and 20 or less.

5. The composite semipermeable membrane according to claim 1, wherein constituent elements of the separation functional layer detected by a combustion method are substantially only hydrogen, carbon, nitrogen, and oxygen.

6. The composite semipermeable membrane according to claim 1, wherein the separation functional layer is decomposed into one or more types of aromatic amines and two or more types of aromatic carboxylic acids or aromatic carboxylates by alkaline hydrolysis.

7. The composite semipermeable membrane according to claim 6, wherein among the aromatic carboxylic acids and the aromatic carboxylates, trimesic acid and a trimesic acid salt occupy a fraction of 90 mass % or more.

* * * * *